Sept. 2, 1969  J. R. PINKHAM  3,464,324
LOOSE GRANULAR FILTER MAKING MACHINE
Filed Sept. 11, 1967  3 Sheets-Sheet 1

INVENTOR.
JESSE R. PINKHAM
BY
John F. Ohland Jr.
ATTORNEY

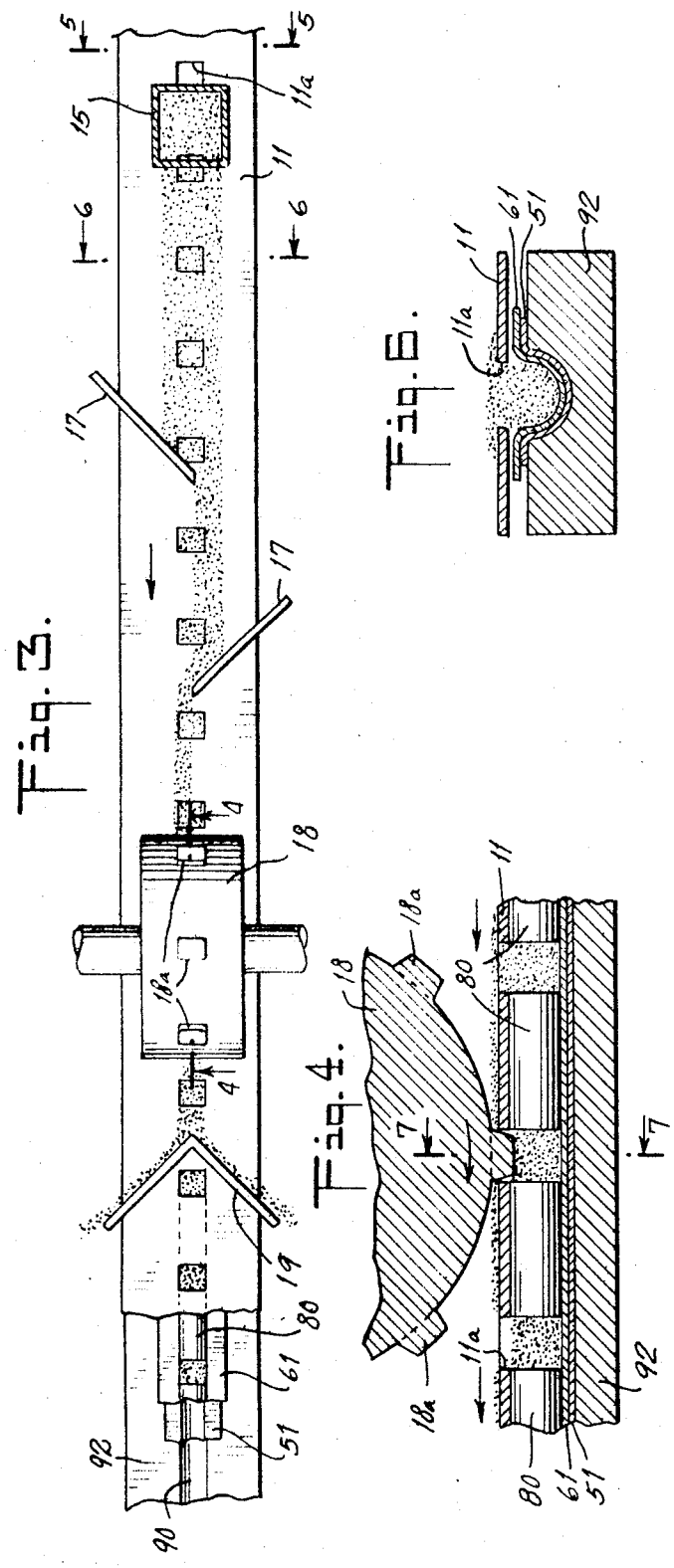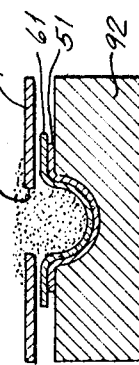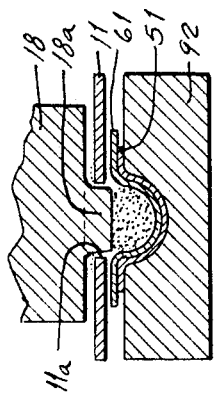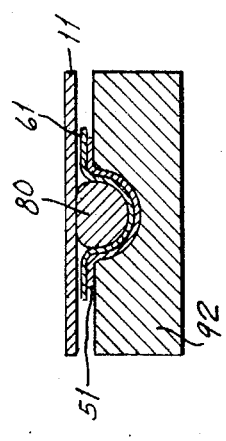

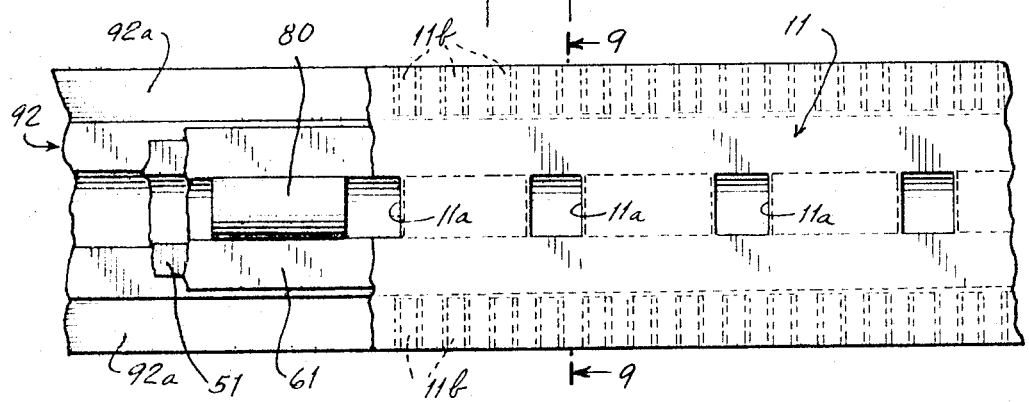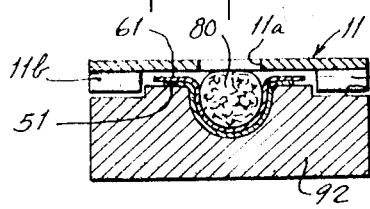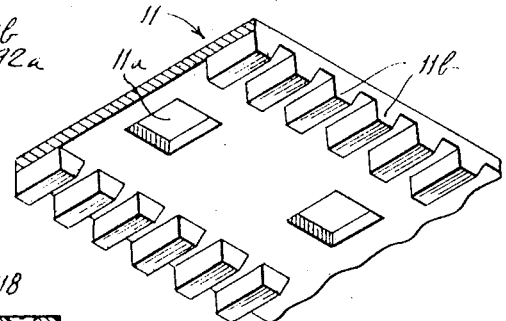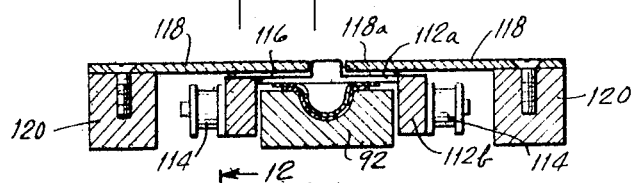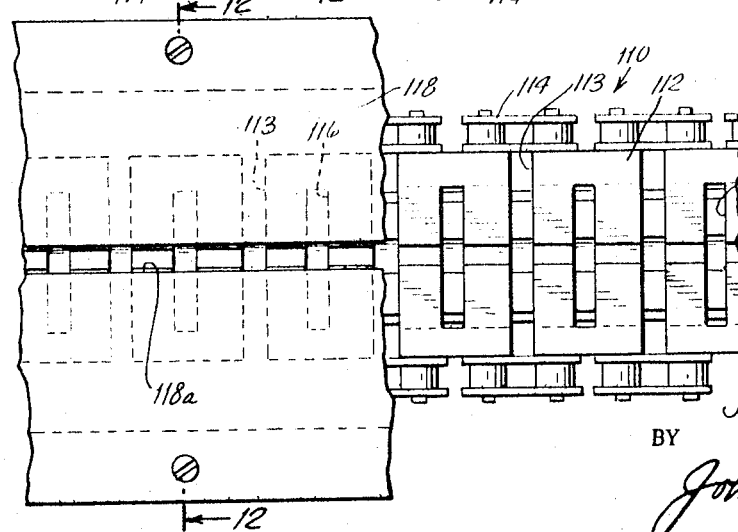

United States Patent Office 3,464,324
Patented Sept. 2, 1969

3,464,324
LOOSE GRANULAR FILTER MAKING MACHINE
Jesse R. Pinkham, Winston-Salem, N.C., assignor to R. J. Reynolds Tobacco Company, Winston-Salem, N.C., a corporation of New Jersey
Filed Sept. 11, 1967, Ser. No. 668,292
Int. Cl. A24c 5/50
U.S. Cl. 93—1                                                    10 Claims

ABSTRACT OF THE DISCLOSURE

An apparatus and process for producing filter tips for cigarettes and the like, the filter tips being derived from rod-shaped assemblies defined by an alternating succession of plugs of filter material and chambers of granular material. The granular material is placed in the voids between the axially aligned row of spaced plugs by arrangement which utilizes a traveling web which is made to run for a considerable distance over the row of plugs. The granular material is continuously deposited through holes in the traveling web, the holes being in timed relationship with the voids.

---

This invention relates to an improvement in the manufacturing of filter tips for cigarettes and the like. More particularly, it relates to an improved form of apparatus, and to the method associated with such apparatus, for making filter tips whose construction is such as to include several sections formed from "plugs" of filter material, for example, material such as cellulose acetate and/or bonded particulate absorbent.

The particular filter tips of concern in the context of the present invention are those which include not only the aforesaid several sections but also provide as a smoke filtering medium a chamber of granular material, for example, of charcoal. This granular material, since it does not lend itself to bonding, spinning, webbing or entrainment within the regular filter material, is conveniently packed in the chamber situated between the spaced plugs of such filter material.

Machines and apparatus have been known for some time that will produce multiple filter elements comprising two or more sections. Some of these machines are capable of producing these elements in such a form, within a paper tube, so that they are adapted for use as recessed mouthpiece filters.

Other machines also known in the art are especially adapted to produce the aforenoted composite type of granular filter tips, that is, they not only operate to space the several plugs of, for example, fibrous filter material, but they are also capable of depositing the granules of charcoal or like material in the voids between spaced fibrous plugs. The normal procedure that is followed after the fabrication of the composite filter elements, as described, is to form a continuous rod-like array of these filter elements and then simply to cut through the fibrous plugs at appropriate points to make the finished filter tips.

For a thorough appreciation and understanding of the background of the present invention, reference may conveniently be made to U.S. Patent 3,259,029 which discloses an apparatus and process for making filter tips for cigarettes. Briefly stated, that patent describes an apparatus which first operates to divide a continuous fibrous rod into plugs and intermittently to feed the cut plugs onto a moving wrapping paper, so that they are axially-aligned, in spaced relationship to each other. Thereafter, the apparatus functions to inject a charge of granular filter material into the series of spaces between adjacent fibrous plugs and finally, forms the wrapping paper so as to enclose the fibrous plugs and the granular material, thereby to produce a continuous rod of the assembled material consisting of the alternating succession of fibrous and granular material.

The granular material injection mechanism of the aforedescribed Patent 3,259,029 is in the form of a collector wheel which collects the granular material from a convenient hopper and retains this material in spaced chambers or pockets at the circumference of such wheel. Considering the wheel as resembling a clock, the injection into the voids between the spaced fibrous elements of the filter takes place at 6 o'clock. In other words, an individual chamber or pocket dumps most of its load into a predetermined one of the voids as it reaches the 6 o'clock point, in substantial tangency with the axially-aligned series of moving fibrous elements. In this particular position, of course, the partially-made rod is open and receptive to the injection of the granules. The collector wheel in such granule injection mechanism is made to run at the same peripheral speed as the wrapping paper and the wrapping paper is conveyed by a belt or the like and carries the fibrous elements past the injection point. The synchronization is such that a void is precisely presented at the desired point of injection.

In the aforedescribed collector wheel type of injection mechanism, it will be apparent that the speed of production is closely related to the free fall of the material. In other words, how fast the filter tips can be turned out depends upon the time taken for the granular material to drop into the void between the filter plugs. In order to avoid the dependency on the free fall of the granular material a mechanically-actuated plunger has sometimes been incorporated with the injector wheel. Such plunger arrangement acts to cut down the time for the injection of the granular material and thereby somewhat enhances the overall speed of production. However, with a wheel of any reasonable diameter, it turns out that the production rate is still limited because of the short radius of contact against the chain of spaced plugs.

Accordingly, it is a principal object of the present invention to overcome the speed problem described above, that is, to avoid the dependency of the production rate on the limitations stemming from the injection wheel configuration.

A consequential object of the above is to produce filter tips for cigarettes or the like in a substantially continuous manner but at a greatly increased production rate.

It is to be especially noted that in fulfillment of the above-stated objects the present invention enables a speed of approximately 150 meters/sec. and, as a consequence, a production rate of the order of 6000 filter tips per minute.

Briefly stated, it is a broad feature of the present invention that the vastly greater speeds and production rates are achieved by a granule depositing mechanism that travels for a considerable distance with the row of spaced plugs and in synchronism therewith. Thus, the movement of the axially aligned plugs is not hampered by the need to adjust to the time factor involved in depositing the granular material into the voids. The granule depositing mechanism of the present invention comprises a traveling web, in the form of a belt of stainless steel or rubber, or in the form of a linked chain. This traveling web is situated above the axially-aligned plugs as they are conveyed along in their partially wrapped state. The traveling web has an extended horizontal run over the row of plugs and is provided with suitably disposed holes in its surface. These holes are so exactly spaced that they are presented over the voids between the fibrous plugs as the traveling web progresses over the path of these plugs. A timing means is, of course, provided so that the movement of the traveling web is properly correlated with the movement of the row of plugs to accomplish the timed deposition of the granular material through the holes in the traveling web and down into the voids.

Although the broad feature of the present invention thus consists in the unique construction of the granule depositing mechanism and the combination of such mechanism with an associated timing means, it will be understood that these features or elements are contemplated as being related and associated with other basic elements of a filter tip making machine. However, for clarity and simplicity in explaining the present invention, the illustrations which follow attempt to highlight the novel features and to place other related elements in a diminished role. Another way of saying this is, that while the present invention is clearly related to, and is defined by, a certain context or milieu, it is not deemed useful to redescribe in detail that entire context but rather to focus on the essential differences that characterize the present invention. It should be borne in mind, however, that although certain basic elements do not, per se, form part of the present invention and for this reason have been placed into the background, the present invention cannot be considered as utterly isolated from them since its important functions are necessarily linked therewith.

The foregoing and other objects, features and advantages of the invention will be apparent from the following more particular description of preferred embodiments of the invention as illustrated in the accompanying drawings.

FIG. 3 is a sectional view taken along the line 3—3 of FIG. 1.

FIG. 4 is a fragmentary view in section taken along the line 4—4 in FIG. 3, and illustrating the details of the contacting roller.

FIG. 5 is a sectional view taken along the line 5—5 of FIG. 3.

FIG. 6 is a sectional view taken along the line 6—6 of FIG. 3.

FIG. 7 is a sectional view taken along the line 7—7 of FIG. 4.

FIG. 8 is a top plan view illustrating another embodiment of the present invention and, particularly, illustrating the traveling web device in the form of a rubber belt.

FIG. 9 is a sectional view taken along the line 9—9 of FIG. 8.

FIG. 10 is a perspective view from the underside of the rubber belt.

FIG. 11 is a top plan view of yet another embodiment of the present invention and, particularly, illustrating the linked chain version for the traveling web.

FIG. 12 is a section view taken along the line 12—12 of FIG. 11.

Figures 1, 2:
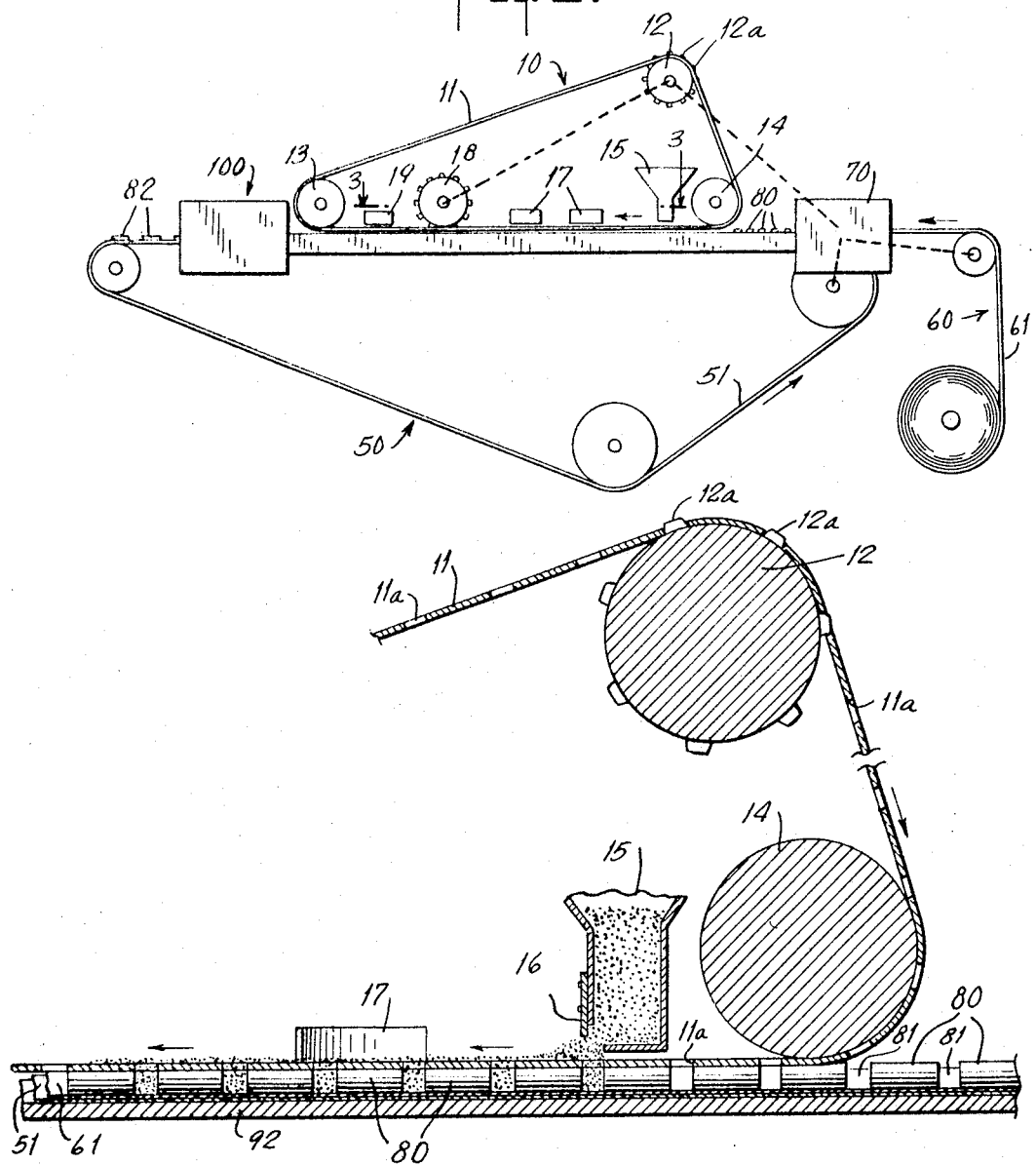
FIG. 1 is a side view of the granular depositing mechanism in accordance with the present invention, and illustrates diagrammatically the basic relationship among the several parts of a filter tip manufacturing apparatus. It also illustrates one particular embodiment of the traveling web device.
FIG. 2 is a vertical section in fragmentary form showing parts of the granular depositing mechanism.

Referring more particularly to the drawing in which similar reference numerals designate corresponding parts, the general arrangement of the apparatus, and also the technique, of the present invention can be appreciated by first referring to FIGS. 1 through 7 in which a preferred embodiment is depicted. In FIG. 1, there is shown the granular depositing mechanism generally designated 10, and in association with the mechanism 10 a conventional conveyor 50, a wrapping paper feeder 60 and the associated means, generally designated 70, and contained within the box.

The associated means 70 comprehends means for synchronously driving the conventional conveyor 50, the wrapping paper feeder 60, as well as the active constituent members of the granular depositing mechanism 10, as will be appreciated by the dotted lines shown in FIG. 1. Also included in the associated means 70 are means for intermittently feeding the fibrous plugs 80 so that they may be conveyed in axially aligned, spaced relationship past the granular depositing mechanism 10. Thus, the wrapping paper 61 is fed from a driving means, in a manner well-known in the art, and is brought into contact with a traveling folding tape 51 forming part of the conveyor 50. The wrapping paper 61 is formed into a generally U-shaped channel. The wrapping paper is maintained in this U-shape, that is, in a partly wrapped state, because the further step of adding the granular material must be carried out. These relationships, that is, the relationships of the wrapping paper 61, the tape conveyor 51 and the filter plugs 80 will become apparent as the description proceeds.

The important point to be borne in mind with respect to FIG. 1 is that the folding tape 51, the wrapping paper 61 and the filter plugs 80 are so carried past the granular depositing station at which the mechanism 10 is located that the depositing of the granules will take place at predetermined positions. Thus, a timing or synchronization means is included as part of the associated means 70 so that the intermittent feeding of the plugs 80 will be in timed relationship with the movement of the mechanism 10.

Referring now to the granular depositing mechanism 10 illustrated in FIG. 1, the traveling web 11 in this embodiment is in the form of a stainless steel belt. The belt 11 is transported by means of a series of pulleys 12, 13 and 14. The pulley 12 is provided with sprockets 12a and is the driving member of this group of pulleys. The other pulleys, that is, pulleys 13 and 14, are take-up or tensioning pulleys and they provide sufficient tension so that the belt 11, as it passes over the moving series of plugs 80, does not become slack. Moreover, the pulleys 13 and 14 insure that the traveling web, here represented as a belt 11, presses against the moving plugs. The belt 11 is provided with a series of spaced holes 11a which are engaged by the teeth 12a on the pulley 12 for the driving of the tape 11. These holes have a dual function, that is, advantageously in this embodiment, they are engaged by the aforesaid teeth 12a for the purposes of driving the tape, and at the same time they are spaced such that they match up with the voids 81 between the adjacent spaced plugs 80 for the essential purpose of the present invention; that is, they provide for the efficient deposition of the granular material, e.g., charcoal, into the voids 81 and to do so without imposing a stringent limitation on the production rate at which filter tips of the multiple-section, granular type may be manufactured.

The granular depositing mechanism 10 also includes the hopper 15 which is provided to contain the granular material, such as charcoal, and to dispense such material onto the belt 11. A gate 16 is included as part of the hopper 15 and by means of this gate a sufficient quantity of granular material, and indeed, a surplus thereof, is dispensed onto the upper surface of the belt as the belt is carried past the hopper 15. The granular material is forced into a path above the openings 11a by means of the screeds 17 (see FIG. 3), thereby insuring the filling of the voids 81. Further upstream in the traveling of the moving belt 11 there is situated a compacting roller 18 which has projections 15a at its periphery. As noted before, the compacting roller is in timed relationship with the other driving elements and is so related to them that these projections 15a project through the holes 11a in the belt 11 and thereby tamp down the granular material that has been deposited into the voids 81.

Just before the belt 11 reaches the return pulley 13, any excess of the granular material remaining on the belt is sheared off by means of the shear plow 19. In most applications, that is, in the case of most materials that are contemplated for use as the granular filter material, there will not be a great amount of excess to be sheared off, so that the shear plow 19 is considered merely as a preferred element for inclusion with the apparatus in accordance with the present invention.

Before considering further the operation and functioning of the granular depositing mechanism 10 upon the traveling filter plugs 80, it may be well at this juncture to consider the prior processing of the filter plugs before reaching the station at which the mechanism 10 is situated, and to consider the later processing of these plugs as well. The filter plugs 80 as seen emerging from the associated means 70 are presented in this axially aligned, spaced relationship after being obtained, for example, from a continuous rod of fibrous material, such as cellulose acetate. These plugs 80 are in short pieces of equal length. A flow control means, in a well-known manner, provides a conduit through which the plugs are pushed onto the advancing wrapping paper 61. Each of these plugs 80 has been cut to predetermined length of the order of 12 millimeters with the length of the voids 81 between the advancing plugs being about the same as the plug length, or approximately 13 millimeters. The wrapping paper 61, and consequently the spaced plugs 80 carried thereby, are moved together to the granular depositing station 10 by a conveying means 50, and in particular, by the belt 51, in a well-known manner.

After the aforesaid initial processing which results in the proper spacing of the plugs 80, they are continuously transported along a trough 90 which is formed in a base member, or what is termed a folder bottom 92.

Following the deposition of the granular material by the mechanism 10, the alternating succession of fibrous and granular material in a rod-like assembly that emerges from the mechanism 10 is processed further by the associated means 100, well-known in the art. The operation of the associated means 100 is such that the wrapping paper 61 is formed so as to completely enclose the fibrous material and the granular material, and thereafter, individual filter elements or units 82 are cut from the finished rod. In other words the three-section filter units 82, consisting of two spaced fibrous sections and a chamber of granular material, are continually cut from a rod and constitute the individual filter tips that are to be applied to cigarettes or the like.

Returning now to the granule depositing mechanism 10, the deposition of the granular material is accomplished as follows: The belt 11 as it comes around the pulley 14 comes into engagement with the advancing filter plugs. The belt 11 is so tensioned and positioned that it presses on the individual plugs. Consequently, there is provided a very good seal and the actual volume of the void is reduced so that an excess of granular material is not placed in the void. This pressing of the belt can best be appreciated by referring to the cross-sectional view of FIG. 5.

As noted previously, the synchronization of the belt 11 with the movement of the spaced plugs 80 is such that the holes 11a are disposed exactly over the voids 81, as best seen in FIG. 2. The speed of the belt 11, of course, matches the speed of the advancing plugs so that a typical hole remains in fixed position with respect to a void for an extended time period corresponding to the length of the run. The effective length of the run referred to is the distance between the hopper 15 and the compacting roller 18 because it is only during this interval that the required action of depositing and packing the granular material into the voids is accomplished.

Referring now to FIGS. 8, 9 and 10, another embodiment of the traveling web is depicted. In accordance with this embodiment, the web is in the form of a rubber belt 11, which has a configuration differing somewhat from the stainless steel belt previously depicted in FIG. 1. The rubber belt 11, in addition to the required spaced holes 11a, has a series of spaced teeth or ribs 11b. This rubber belt may be constructed, for purposes of the invention, by taking a conventional timing belt and modifying it in the manner shown, that is, by removing the middle portions of what are conventional teeth on such timing belt and leaving only the portions as shown.

In this alternative embodiment of FIGS. 8 through 10, the teeth 11b provide not only the function of properly timing the movement of the belt 11, but, advantageously, they cooperate with the folder bottom 92 so as to keep the holes 11a in the belt 11 in proper transverse alignment over the voids 81. Thus, the teeth 11b engage with the shoulder 92a formed in this modified version of folder bottom 92, as seen in FIG. 9, and thereby prevent any wobbling of the belt 11 from side to side.

Referring now to FIGS. 11 and 12, there will be seen in the several views yet another embodiment of the traveling means used to effect the proper deposition of the granular material in accordance with the previously-described general scheme for this purpose. It should be noted that the same essential function is served by the linked chain 110, depicted in these figures, as was served before in the prior embodiments by the belt 11. Only slight structural changes have been made to accommodate this embodiment.

The linked chain 110 is composed of segments 112 generally U-shaped in cross-section with a protrusion that extends upward and level with the surface of plate 118. The segments are linked together, with spaces 113 between adjacent segments by means of roller-type links 114 of known construction. Each of the spaced segments 112 comprises a web portion 112a and downwardly-directed flange portions 112b. The web portions 112a are provided with transverse slots 116. These slots 116 act in cooperation with a stationary plate to define restrictive openings which, as will become apparent, have the same function as the openings or holes 11a that were provided in the previously-described belts 11.

As will be evident, the linked chain arrangement being considered here would be driven by means of double sprockets; that is, by means of spaced sprockets adapted to fit into the spaces between the rollers at either edge of the linked chain 110.

It will be appreciated from FIGS. 11 and 12 that the traveling linked chain 110 is associated with the stationary plate 118 which is disposed above the linked chain 110 and is suitably attached to a frame member 120. The purpose of the stationary plate 118 is to cooperate with the advancing web portions 112a; more specifically, to define with the transverse slotted openings 116, and with the spaces 113 between adjacent segments 112, the requisite openings for the deposition of granular material into the spaced voids. Thus, the stationary plate 118 has a longitudinally-extending slotted opening 118a, which, as is apparent overlies the transverse openings 113 and 116 effectively to create therewith square-shaped openings through which the granular material is able to reach the voids.

The present invention, in its several embodiments has been set forth as an efficient solution to the difficulties attending the production of filter tips for cigarettes and the like. It will be manifest that the invention provides an apparatus and a process which is well calculated to increase significantly the production rate of the type of filter tips which are formed from a rod-like assembly defined by an alternating succession of filter plugs and granular material.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. Apparatus for producing filter tips for cigarettes and the like, the filter tips being derived from rod-shaped assemblies defined by an alternating succession of plugs of fibrous filter material and granular material, said apparatus comprising:
- means for conveying a strip of wrapping paper carrying a succession of axially aligned, spaced filter plugs;
- means for depositing a quantity of granular material in the voids between the spaced plugs, said means for depositing comprising a traveling web moving in parallel with said spaced plugs, said web having holes therein for allowing the granular material to be deposited into the voids;
- means for maintaining said spaced relationship on said strip of wrapping paper, and means for synchronizing the movement of said plugs with the movement of said web so that the holes in the web coincide with the voids between the plugs to allow complete deposition of the granular material into said voids;
- a hopper for containing the granular material situated above the lower run of the traveling web, said hopper including means for dispensing said material onto the top surface of the lower run of said traveling web;
- screeding means for confining the granular material to a path in line with said holes in said traveling web;
- a compacting roller located upstream of said hopper, said roller having projections thereon, said projections being in timed relationship with the openings in said traveling web so that said projections act to tamp down discretely the previously deposited granular material disposed in the successive voids between the filter plugs.

2. Apparatus as defined in claim 1, further including means for forming the wrapping paper into a transverse U-shape.

3. Apparatus as defined in claim 1, further including means for guiding the folding tape and the wrapping paper.

4. Apparatus as defined in claim 3, wherein said guiding means comprises a trough formed in a folder bottom.

5. Apparatus as defined in claim 1, further including means for removing the excess granular material from said traveling device.

6. Apparatus as defined in claim 1, in which said traveling means is in the form of a belt having spaced teeth adjacent either edge and adapted to engage snugly with shoulders formed in the stationary folder bottom.

7. Apparatus as defined in claim 1, further including a sprocket having teeth thereon for engaging with said holes in said traveling web.

8. Apparatus as defined in claim 1, in which means are provided for pressing said web against the spaced fibrous plugs.

9. Apparatus as defined in claim 1, in which the traveling web is in the form of a linked chain, said linked chain comprising U-shaped segments.

10. Apparatus as defined in claim 1, in which movement of said traveling device is provided by a series of spaced pulleys, the arrangement being such that the traveling device presses against the moving fibrous plugs.

References Cited
UNITED STATES PATENTS

| | | | |
|---|---|---|---|
| 1,305,584 | 6/1919 | Yahle | 141—133 |
| 3,259,029 | 7/1966 | Hall et al. | |
| 3,343,462 | 9/1967 | Sexstone. | |
| 3,367,245 | 2/1968 | Wisdom. | |

BERNARD STICKNEY, Primary Examiner

U.S. Cl. X.R.

131—61; 141—131